(12) United States Patent
Oh et al.

(10) Patent No.: US 11,754,149 B2
(45) Date of Patent: Sep. 12, 2023

(54) TRANSMISSION FOR ELECTRIC CAR WITH IMPROVED ONE-WAY CLUTCH

(71) Applicant: NEOOTO CO., LTD., Seoul (KR)

(72) Inventors: Se Hoon Oh, Gyeonggi-do (KR); Won Hyeong Jeong, Seoul (KR); Jae Oh Han, Seoul (KR); Tae Su Kim, Seoul (KR); Jong Seok Lee, Seoul (KR); Han Su Jeon, Seoul (KR); Duk Soon Choi, Chungcheongnam-do (KR); Sun Hyun Kim, Seoul (KR)

(73) Assignee: NEOOTO CO., LTD., Seoul (KR)

( * ) Notice: Subject to any disclaimer, the term of this patent is extended or adjusted under 35 U.S.C. 154(b) by 0 days.

(21) Appl. No.: 17/938,952

(22) Filed: Sep. 7, 2022

(65) Prior Publication Data

US 2023/0077011 A1 Mar. 9, 2023

(51) Int. Cl.
| | | |
|---|---|---|
| *F16H 3/72* | (2006.01) | |
| *F16H 1/28* | (2006.01) | |
| *B60K 1/00* | (2006.01) | |
| *F16H 3/44* | (2006.01) | |
| *F16D 21/02* | (2006.01) | |

(52) U.S. Cl.
CPC ............... *F16H 3/72* (2013.01); *F16H 1/2818* (2013.01); *B60K 2001/001* (2013.01); *F16D 21/02* (2013.01); *F16H 2003/442* (2013.01); *F16H 2200/0034* (2013.01)

(58) Field of Classification Search
CPC .................. F16H 3/72; F16H 2003/442; F16H 2200/0021; B60K 2001/001; F16H 1/2818; F16D 21/02
See application file for complete search history.

(56) References Cited

U.S. PATENT DOCUMENTS

| | | | | |
|---|---|---|---|---|
| 2,737,064 | A * | 3/1956 | Stoeckicht | F16H 1/2818 188/151 R |
| 3,434,374 | A * | 3/1969 | Barwig et al. | F16H 1/2863 475/116 |
| 3,884,098 | A * | 5/1975 | Gumpoltsberger | F16H 1/28 74/606 R |
| 4,299,141 | A * | 11/1981 | Fairchild | F16H 3/54 192/17 R |
| 6,565,476 | B1* | 5/2003 | Bae | F16D 25/0638 475/320 |
| 8,998,765 | B2* | 4/2015 | Sten | B60K 17/165 475/221 |

FOREIGN PATENT DOCUMENTS

KR 10-2012-0138193 12/2012

* cited by examiner

*Primary Examiner* — Tinh Dang
(74) *Attorney, Agent, or Firm* — JCIPRNET (57) ABSTRACT

Provided are an electric vehicle transmission including an improved one-way clutch.

An electric vehicle transmission includes a sun gear unit connected to a transmission motor, a plurality of planetary gear units connected to the sun gear unit, and a ring gear unit connected to the planetary gear units, and further includes a cage unit arranged to surround the plurality of planetary gear units at an inner side thereof, a housing unit arranged at an outer side of the cage unit and having a hollow therein, at least one guide unit arranged between the cage unit and the housing unit, and an adjustment unit configured to adjust a position of the cage unit with respect to the housing unit.

5 Claims, 11 Drawing Sheets

TRANSMISSION FOR ELECTRIC CAR WITH IMPROVED ONE-WAY CLUTCH

FIELD OF THE INVENTION

The disclosure relates to an electric vehicle transmission, and more particularly to, an electric vehicle transmission including an improved one-way clutch.

PRIOR ART

Recently, as interest in environmental issues has increased, research and development on eco-friendly or renewable energy such as electrical energy, hydrogen energy, and solar energy has been concentrated throughout the industry. Electric vehicles are at the forefront of such changes in the industrial environment, and are expected to replace traditional internal combustion engine vehicles in the near future as countries around the world are increasingly interested in environmental issues and battery efficiency and capacity are dramatically improved.

Unlike internal combustion engine vehicles that use fossil fuels, electric vehicles are driven only by electrical energy by using batteries, and thus, are not only environmentally friendly in that no exhaust gas is generated, but also have their overall structures simplified because the electric vehicles do not require an internal combustion engine and are driven only by an electric motor. In addition, electric vehicles have various advantages compared to internal combustion engine vehicles of the related art, such as fewer overall parts compared to internal combustion engine vehicles, excellent space usability and design as an engine room is not required, and a significant reduction in noise.

Meanwhile, in electric vehicles of the related art, power characteristics of a motor are similar to characteristics required for a driving wheel of a vehicle, and thus, a single gear reducer is often used instead of a transmission. However, recently, in an area where a motor has high power consumption efficiency, a single-speed or two-speed transmission has been actively introduced in order to increase the operating time and reduce the load on the motor and peripheral devices.

However, electric vehicle transmissions of the related art include a total of three shafts including a motor shaft, a planetary gear unit shaft, and a differential gear shaft. Thus, there is a problem in that the overall volume is large. In addition, because a plurality of shafts, friction gears, external gears, and shift mechanisms are included, there is a problem in that the structure of the transmissions becomes complicated and the weight of the transmissions increases. As a result, the weight of the entire electric vehicle as well as the transmissions becomes heavy, reducing fuel efficiency and making it difficult to manufacture due to the complicated structure. Electric vehicles need to offset the increased weight due to batteries, and it is urgent to improve the mileage during a single charge. Thus, miniaturization and weight reduction of electric vehicle transmissions is one of the biggest issues in the field of electric vehicles.

The background art as described above is technological information that the inventor has kept to derive the disclosure or has acquired in the process of deriving the disclosure, and is not always considered as a known technology that has been published prior to filing of the disclosure.

DOCUMENT OF RELATED ART (Patent Document 1) Korean Public Patent Notification KR 10-2012-0138193 A

DISCLOSURE OF THE INVENTION

Technical Goal of the Invention

To solve the above-described problems, provided is an electric vehicle transmission which has a compact and simple structure such that weight reduction of the transmission and electric vehicle is achieved, and is capable of easily performing a shift operation.

However, the above technical features are exemplary, and scope of the disclosure is not limited thereto.

Means for Achieving Technical Goal

An electric vehicle transmission according to an embodiment includes a sun gear unit connected to a transmission motor, a plurality of planetary gear units connected to the sun gear unit, and a ring gear unit connected to the planetary gear units, and further includes a cage unit arranged to surround the plurality of planetary gear units at an inner side thereof, a housing unit arranged at an outer side of the cage unit and having a hollow therein, at least one guide unit arranged between the cage unit and the housing unit, and an adjustment unit configured to adjust a position of the cage unit with respect to the housing unit, wherein the adjustment unit is inserted into a fastening hole of the cage unit, protrudes to outside through an adjustment window formed on one side of the housing unit, and is configured to adjust a rotation angle of the cage unit with respect to the housing unit to perform a shift operation.

In the electric vehicle transmission according to an embodiment, the cage unit may include a plurality of insertion grooves apart by a predetermined distance along an outer circumferential surface thereof, the housing unit may include a plurality of seating grooves corresponding to the insertion grooves, and the at least one guide unit may be inserted into the insertion grooves, respectively, and while the cage unit rotates by the adjustment unit, may be seated in the seating grooves or may deviate therefrom to perform a shift operation.

In the electric vehicle transmission according to an embodiment, when the at least one guide unit is arranged in a center of the adjustment window, the at least one guide unit may be seated in the insertion grooves to form a neutral state, and when the at least one guide unit rotates by a predetermined angle or more from the center of the adjustment window to one side or other side thereof, the at least one guide unit may deviate from the seating grooves to generate power.

In the electric vehicle transmission according to an embodiment, the cage unit may include a first cage and a second cage, arranged in an axial direction, the ring gear unit may include a first ring gear and a second ring gear, arranged at inner sides of the first cage and the second cage, respectively, the planetary gear units may include a planetary gear shaft, a plurality of first planetary gears arranged on one side of the planetary gear shaft and connected to the sun gear unit and the first ring gear, and a second planetary gear arranged on the other side of the planetary gear shaft and connected to the second ring gear, the at least one guide unit may include a first guide pin connected to the first cage and a second guide pin connected to the second cage, and a neutral state and first-stage and second-stage gear shift operations may be performed according to rotation angles of the first guide pin and the second guide pin.

In the electric vehicle transmission according to an embodiment, when the first guide pin and the second guide pin are arranged in a center of the adjustment window in a circumferential direction, the neutral state is formed, when the first guide pin rotates by a predetermined angle or more from the center of the adjustment window to one side or the other side thereof and the second guide pin is arranged in the center of the adjustment window, a first-stage gear shift state is formed, and when the second guide pin rotates by a predetermined angle or more from the center of the adjustment window to one side or the other side thereof and the first guide pin is arranged in the center of the adjustment window, a second-stage shift state is formed.

These and/or other aspects will become apparent and more readily appreciated from the following detailed description of the embodiments, the accompanying drawings, and claims.

Effect of the Invention

A transmission according to an embodiment may perform a two-speed operation with a simple configuration, and may reduce the overall size and weight of a transmission and a powertrain device of a vehicle including the same by integrating a planetary gear shaft.

A transmission according to an embodiment may perform a shift operation even when an adjustment unit is rotated in either left or right direction, and thus, may easily perform the shift operation and may be easily linked with other configurations of a powertrain mechanism of an electric vehicle.

DESCRIPTION OF EMBODIMENT

Various modifications may be applied to the present embodiments, and particular embodiments will be illustrated in the drawings and described in the detailed description section. However, this is not intended to limit the disclosure to particular embodiments, and it is to be appreciated that all changes, equivalents, and substitutes that do not depart from the spirit and technical scope of the disclosure are encompassed in the disclosure. In the description of the disclosure, although illustrated in other embodiments, the same components are indicated by the same reference numerals.

Hereinafter, embodiments will be described, in detail, with reference to the accompanying drawings, and in the description with reference to the drawings, the same or corresponding components are indicated by the same reference numerals and redundant descriptions thereof are omitted.

In the following embodiment, it will be understood that although the terms "first," "second," etc. may be used herein to describe various components, these components should not be limited by these terms. These terms are only used to distinguish one component from another.

In the following embodiment, the singular forms "a," "an," and "the" are intended to include the plural forms as well, unless the context clearly indicates otherwise.

In the following embodiment, it will be further understood that the terms "comprises" and/or "comprising" used herein specify the presence of stated features or components, but do not preclude the presence or addition of one or more other features or components.

Sizes of components in the drawings may be exaggerated for convenience of explanation. In other words, since sizes and thicknesses of components in the drawings are arbitrarily illustrated for convenience of explanation, the following embodiments are not limited thereto.

In the following embodiment, the x-axis, the y-axis, and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another. When a certain embodiment may be implemented differently, a specific process order may be performed differently from the described order. For example, two consecutively described processes may be performed substantially at the same time or performed in an order opposite to the described order.

The terms used in the present specification are merely used to describe particular embodiments, and are not intended to limit the disclosure. Also, it will be understood that the terms "including," "having," and "comprising" used herein are intended to indicate the existence of features, numbers, steps, operations, components, and parts, described in the specification, or combinations thereof, and are not intended to preclude the possibility that one or more other features, numbers, steps, operations, components, and parts, or combinations thereof may exist or may be added.

Figure 1:
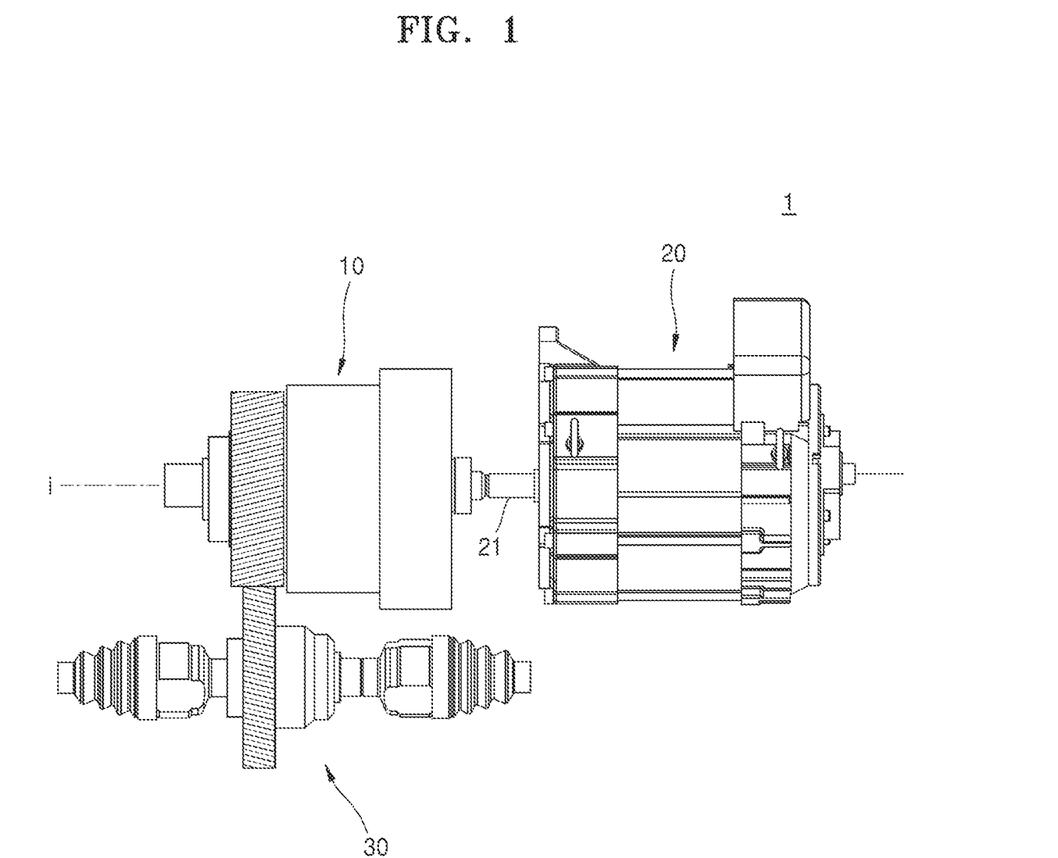
FIG. 1 shows a powertrain device including a transmission, according to an embodiment.
Figure 2:
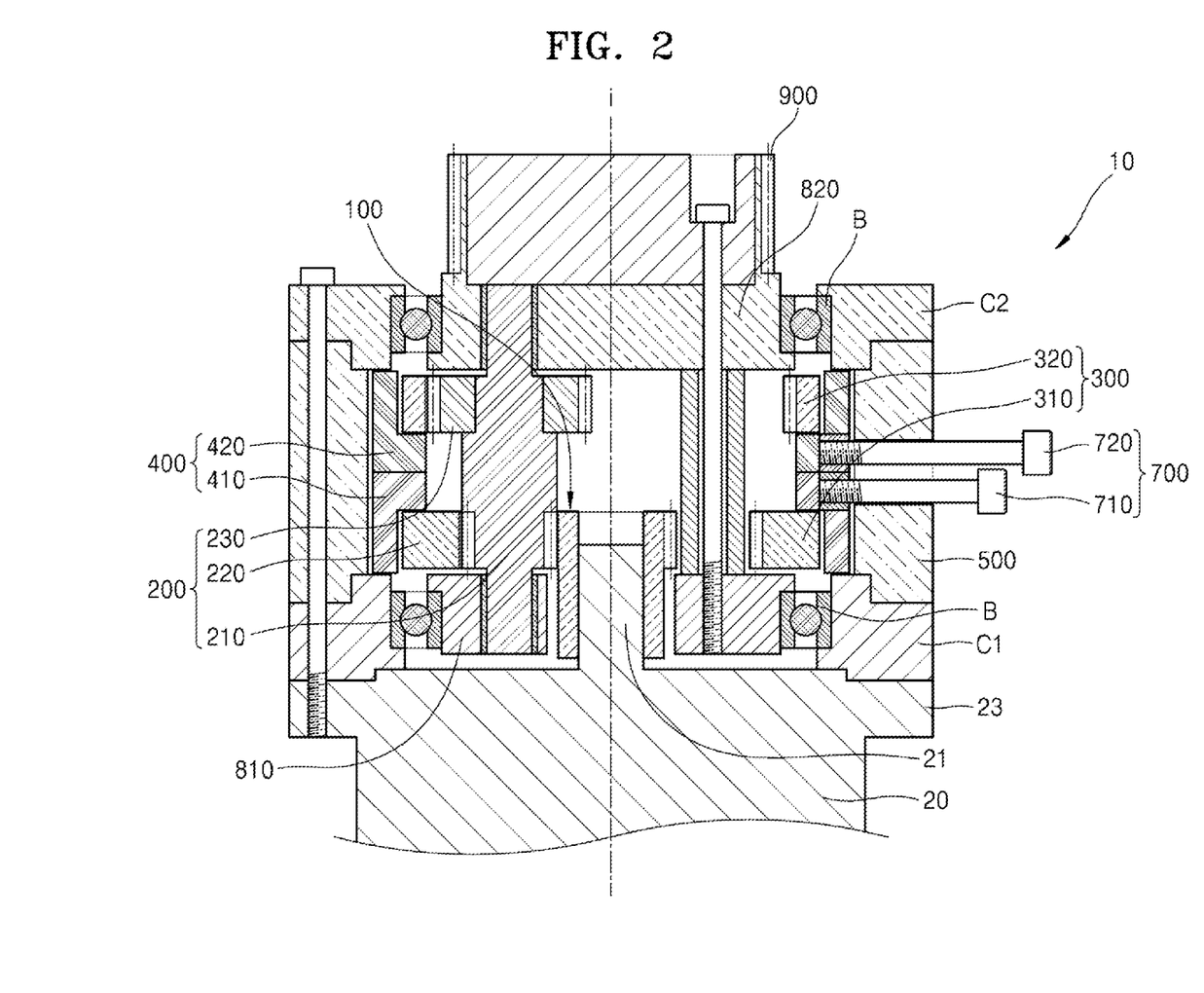
FIG. 2 is a cross-section of a transmission according to an embodiment.
Figure 9:
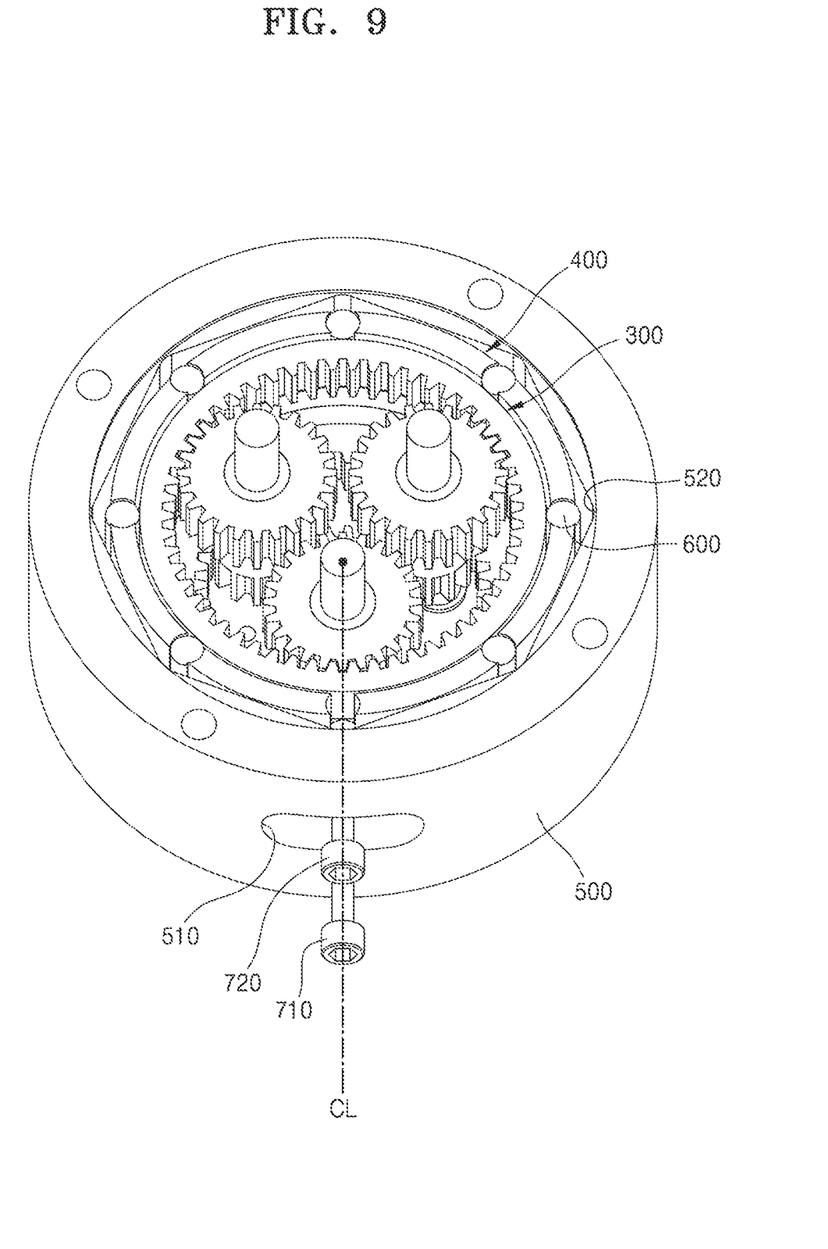
FIGS. 9 to 11 show an operating state of a guide unit according to an embodiment.
Figure 10:
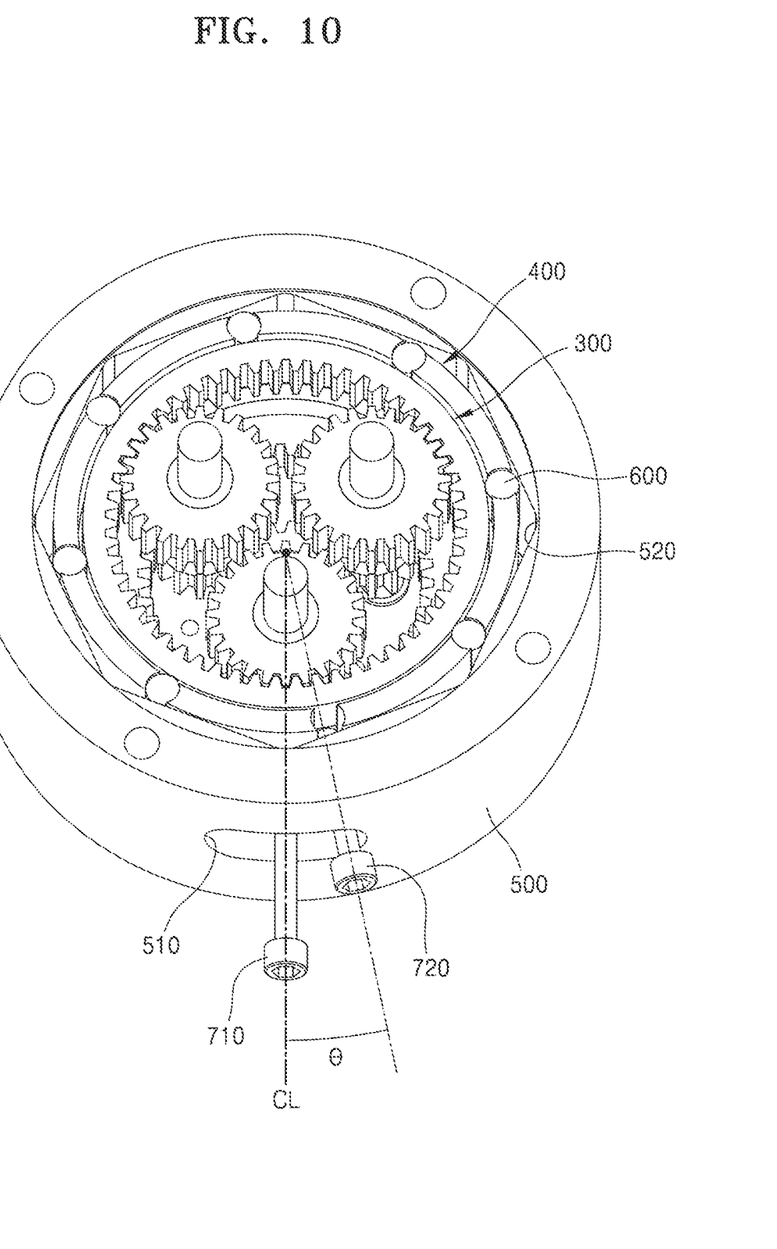
Figure 11:
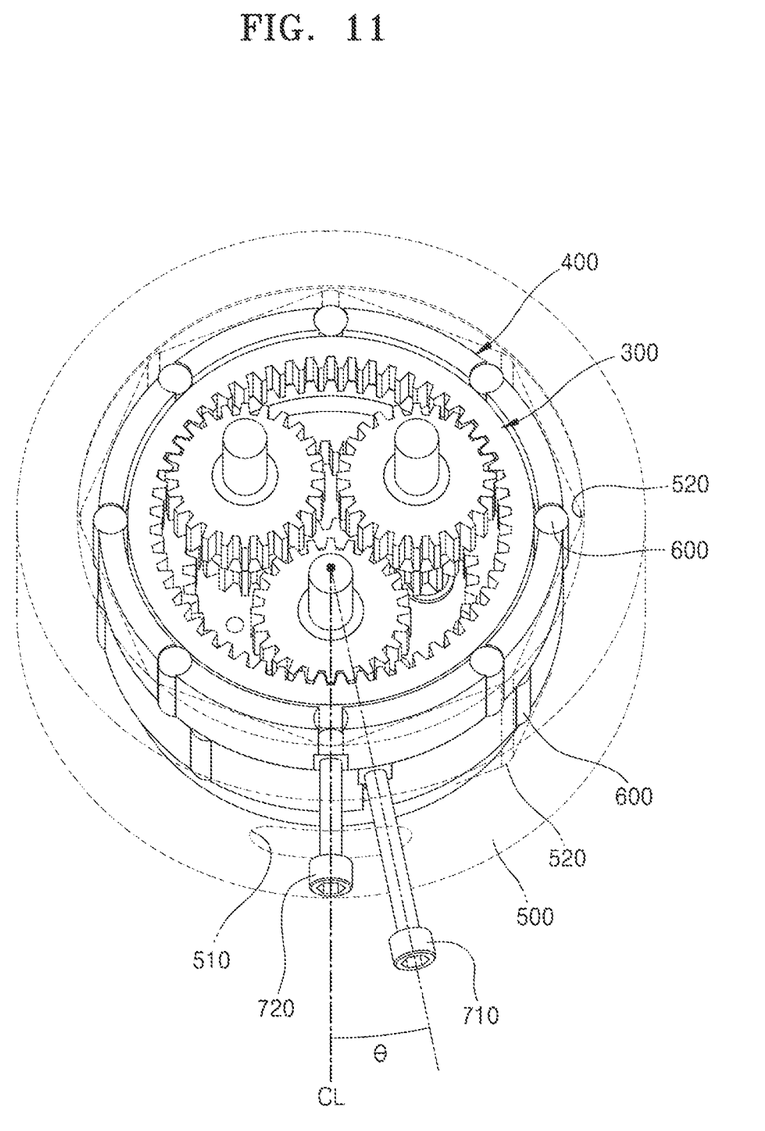

FIG. 1 shows a powertrain device 1 including a transmission 10, according to an embodiment, FIG. 2 is a cross-section of the transmission 10 according to an embodiment, FIGS. 3 to 8 show configurations of the transmission 10 according to an embodiment, and FIGS. 9 to 11 show an operating state of a guide unit 600 according to an embodiment.

Referring to FIG. 1, the powertrain device 1 according to an embodiment may include the transmission 10, a power source 20, and a differential device 30.

The transmission 10 is connected to the power source 20, and receives power from the power source 20 to rotate and perform a shift operation. The transmission 10 is described below.

The power source 20 is a member that supplies power to the transmission 10, and may be, for example, a motor. The power source 20 includes a rotation shaft 21 that transmits power to the transmission 10, and the rotation shaft 21 may be the same as an input axis i of the transmission 10.

The differential device 30 may be connected to the transmission 10. For example, the differential device 30 may be connected to an output unit 800 of the transmission 10, and thus, may transmit a driving force to tires of an electric vehicle.

Referring to FIGS. 2 to 8, the transmission 10 according to an embodiment may include a sun gear unit 100, a planetary gear unit 200, a ring gear unit 300, a cage unit 400, a housing unit 500, the guide unit 600, and an adjustment unit 700.

Figure 3:
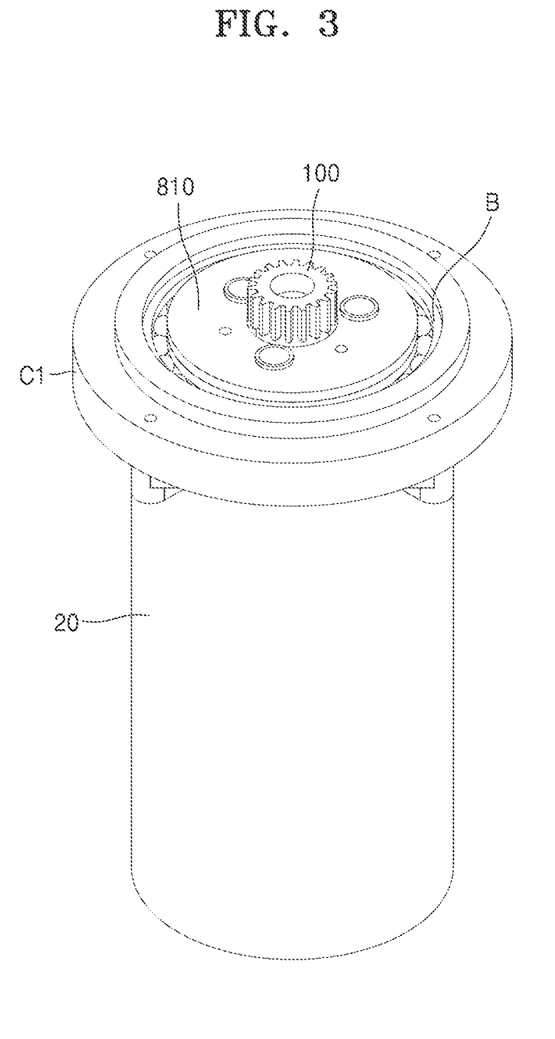
FIGS. 3 to 8 show configurations of a transmission according to an embodiment.

The sun gear unit 100 is a member that is connected to the power source 20, and is rotated by the power source 20 to supply power to the transmission 10. In an embodiment, the sun gear unit 100 may be inserted into one end portion of the rotation shaft 21 of the power source 20. As shown in FIGS. 2 and 3, the rotation shaft 21 of the power source 20 is inserted into a first carrier 810, and the sun gear unit 100 connected to an end portion of the rotation shaft 21 may be arranged to face the power source 20 with the first carrier 810 therebetween.

In an embodiment, a support frame 23 may be arranged on an upper portion of the power source 20. The shape and size of the support frame 23 are not particularly limited, and may be a polygon or a circle. In an embodiment, the support frame 23 may have a shape corresponding to the housing unit 500.

In an embodiment, a first cover C1 may be arranged on the support frame 23, and the sun gear unit 100 and the first carrier 810 may be arranged at an inner side of the first cover C1.

In an embodiment, a bearing B may be arranged between the first cover C1 and the first carrier 810.

Figure 5:
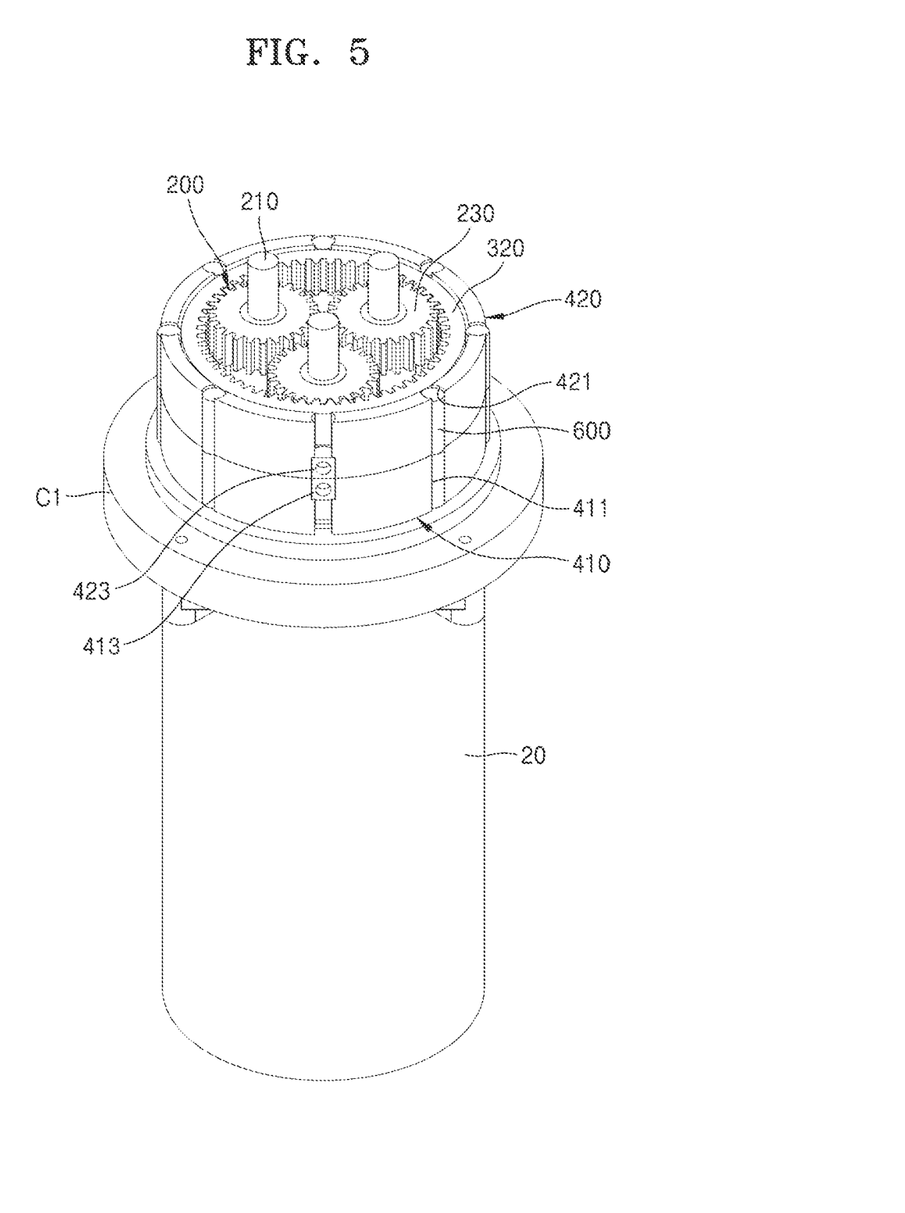

The planetary gear unit 200 is connected to the sun gear unit 100, and may be connected to the ring gear unit 300. For example, as shown in FIGS. 2 and 5, the planetary gear unit 200 may include a planetary gear shaft 210, a first planetary gear 220, and a second planetary gear 230.

The planetary gear shaft 210 is a bar-shaped member extending in a longitudinal direction of the transmission 10. One end portion of the planetary gear shaft 210 may be inserted into the first carrier 810 arranged at the inner side of the first cover C1, and the other end portion thereof may be inserted into a second carrier 820 arranged at an inner side of a second cover C2.

The first planetary gear 220 is a planetary gear inserted into one side of the planetary gear shaft 210. The first planetary gear 220 may be in contact with the sun gear unit 100 and a first ring gear 310. Accordingly, when the sun gear unit 100 operates, the first ring gear 310 may rotate while the first planetary gear 220 engaged with the sun gear unit 100 rotates.

The second planetary gear 230 is a planetary gear inserted into the other side of the planetary gear shaft 210, and may have an external diameter greater than that of the first planetary gear 220. The second planetary gear 230 may be in contact with a second ring gear 320. Accordingly, when the sun gear unit 100 operates, the planetary gear shaft 210 may rotate while the first planetary gear 220 engaged with the sun gear unit 100 rotates, and the second ring gear 320 may rotate while the second planetary gear 230 inserted into the planetary gear shaft 210 rotates.

Figure 4:
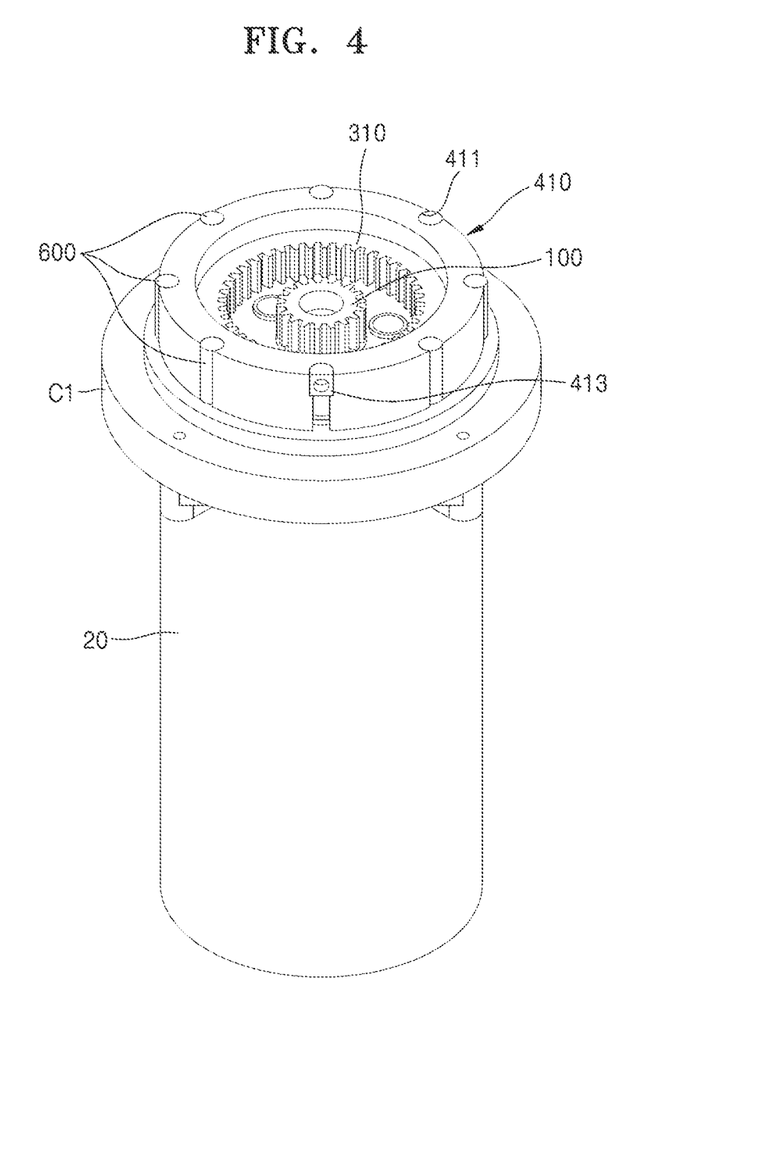

The ring gear unit 300 may be arranged at an inner side of the transmission 10 so as to be connected to the planetary gear unit 200. For example, as shown in FIGS. 2, 4, and 5, the ring gear unit 300 may include the first ring gear 310 and the second ring gear 320.

The first ring gear 310 is a ring-shaped member arranged above the first cover C1, and may be arranged at a position corresponding to the first planetary gear 220. The first ring gear 310 may include, at an inner side thereof, a gear engaged with the first planetary gear 220. Accordingly, when the first planetary gear 220 rotates, the first ring gear 310 also rotates.

The second ring gear 320 is a ring-shaped member arranged above the first ring gear 310, and may be arranged at a position corresponding to the second planetary gear 230. The second ring gear 320 may include, at an inner side thereof, a gear engaged with the second planetary gear 230. Accordingly, when the second planetary gear 230 rotates, the second ring gear 320 also rotates.

The cage unit 400 includes, at an inner side thereof, an inner area in which the sun gear unit 100, the planetary gear unit 200, and the ring gear unit 300 are arranged. For example, the cage unit 400 is a ring-shaped member, and may be arranged to surround the ring gear unit 300. In an embodiment, the cage unit 400 may include a first cage 410 and a second cage 420.

The first cage 410 is arranged to surround the sun gear unit 100, the first planetary gear 220, and the first ring gear 310, and has a ring shape. The first cage 410 may be arranged above the first cover C1.

In an embodiment, the first cage 410 may include a plurality of insertion grooves 411 in an outer circumferential surface thereof. The guide unit 600 is inserted into each of the insertion grooves 411, and thus, may be in contact with an inner circumferential surface of the housing unit 500. The insertion groove 411 may be formed by a portion of the outer circumferential surface of the first cage 410 being concavely recessed inwardly.

The number, shape, and arrangement angle of the insertion grooves 411 are not particularly limited. The insertion groove 411 may include a plurality of insertion grooves which may be apart by equal distances or may be arranged at different angles. Also, the insertion groove 411 may have a shape corresponding to a shape of the guide unit 600. In an embodiment, the first cage 410 may include a fastening hole 413 in the outer circumferential surface thereof. A separate groove distinct from the insertion groove 411 may be formed in the outer circumferential surface of the first cage 410, and a separate member having formed therein the fastening hole 413 may be inserted into the groove. Alternatively, the fastening hole 413 may be formed directly in the outer circumferential surface of the first cage 410.

The adjustment unit 700 (for example, a first adjustment pin 710) may be inserted into the fastening hole 413. Accordingly, when an angle of the adjustment unit 700, that is, when a direction in which the adjustment unit 700 is directed is changed, the first cage 410 may rotate.

The second cage 420 may be arranged on the first cage 410. The second cage 420 may have the same shape as the first cage 410. The second cage 420 may be arranged to surround the sun gear unit 100, the second planetary gear 230, and the second ring gear 320.

In an embodiment, the second cage 420 may include a plurality of insertion grooves 421 in an outer circumferential surface thereof. The guide unit 600 is inserted into each of the insertion grooves 421, and thus, may be in contact with the inner circumferential surface of the housing unit 500. The insertion groove 421 may be formed by a portion of the outer circumferential surface of the second cage 420 being concavely recessed inwardly.

The number, shape, and arrangement angle of the insertion grooves 421 are not particularly limited. The insertion groove 421 may include a plurality of insertion grooves which may be apart by equal distances or may be arranged at different angles. Also, the insertion groove 421 may have a shape corresponding to the shape of the guide unit 600.

For example, the insertion groove 421 formed in the second cage 420 may be provided with a shape and number corresponding to the insertion groove 411 formed in the first cage 410. Accordingly, as shown in FIG. 5, when the first cage 410 and the second cage 420 are arranged at the same angle as each other, the insertion grooves 411 and 421 may be arranged to be continuous.

In an embodiment, the second cage 420 may include a fastening hole 423 in the outer circumferential surface thereof. A separate groove distinct from the insertion groove 421 may be formed in the outer circumferential surface of the second cage 420, and a separate member having formed therein the fastening hole 423 may be inserted into the groove. Alternatively, the fastening hole 423 may be formed directly in the outer circumferential surface of the second cage 420.

The adjustment unit 700 (for example, a second adjustment pin 720) may be inserted into the fastening hole 423. Accordingly, when the adjustment unit 700 rotates, that is, when a direction in which the adjustment unit 700 is directed is changed, the second cage 420 may rotate.

Figure 6:
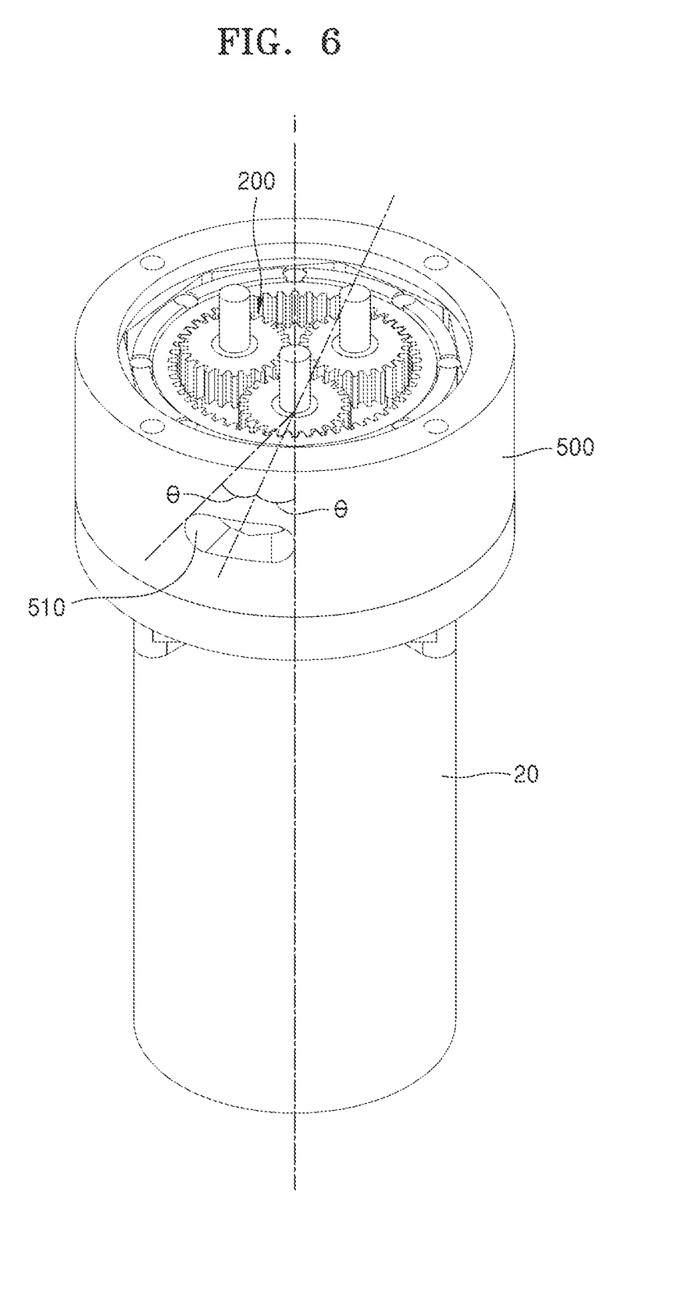
Figure 7:
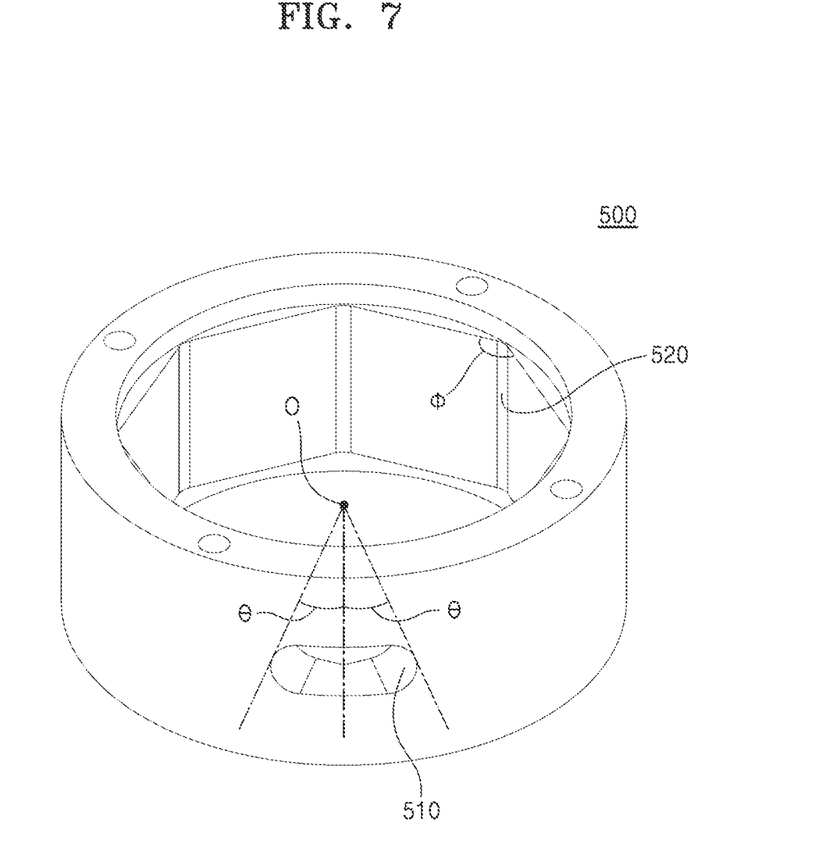
Figure 8:
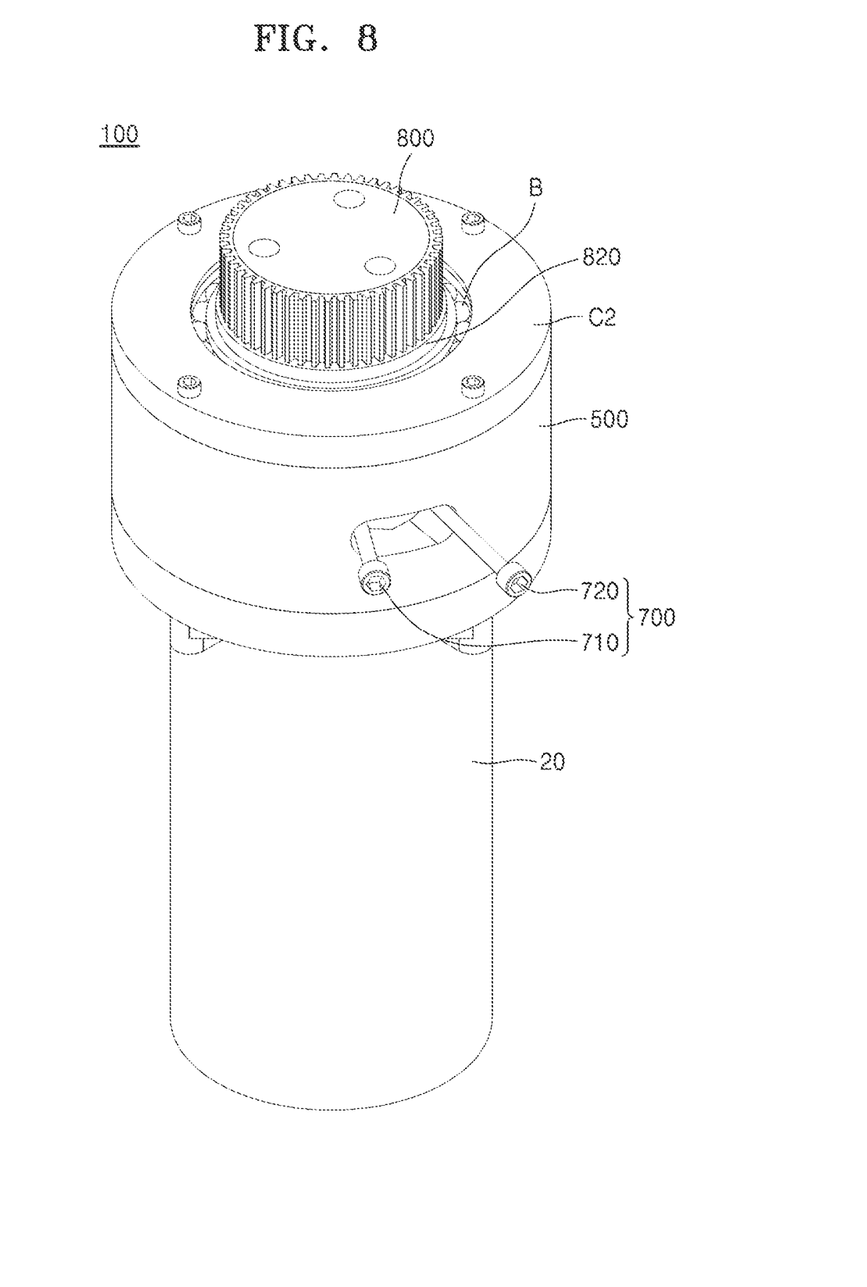

In an embodiment, in a neural state, that is, in a state in which the cage unit 400 is not rotated by the adjustment unit 700, the fastening holes 413 and 423 may be arranged at the same position as shown in FIG. 6.

The housing unit 500 forms an outer shape of the transmission 10, and may have another member of the transmission 10 arranged at an inner side thereof. For example, the housing unit 500 is a cylindrical member having an empty interior, and may be arranged on the first cover C1.

In an embodiment, the housing unit 500 may include an adjustment window 510 in an outer circumferential surface thereof. The adjustment window 510 is formed to pass through the housing unit 500, and the adjustment unit 700 may protrude toward the outside through the adjustment window 510 while the guide unit 600 is inserted into the cage unit 400.

The shape and size of the adjustment window 510 are not particularly limited, and may have a shape and size that are easily manipulated by other devices or members because the adjustment unit 700 protrudes to the outside. For example, the adjustment window 510 may have a symmetrical shape with respect to an imaginary line extending vertically from a center O of the housing unit 500. Accordingly, the adjustment unit 700 may secure a sufficient rotation distance in both left and right directions in a neutral state, that is, in a state in which the cage unit 400 is not rotated.

In an embodiment, the outer circumferential surface of the housing unit 500 may have a cylindrical shape, and the inner circumferential surface thereof may be a polygon. For example, referring to FIGS. 6 and 7, the inner circumferential surface of the housing unit 500 may have a shape of a regular octagonal prism.

The housing unit 500 may have a seating groove 520 in the inner circumferential surface thereof. The seating groove 520 may be formed to correspond to the insertion grooves 411 and 421 of the cage unit 400. Accordingly, in a state in which the transmission 10 is in a neutral state, that is, a state in which the cage unit 400 is not rotated, the guide unit 600 inserted into the insertion grooves 411 and 421 may be seated in the seating groove 520. The seating groove 520 may be arranged in an area in which an inner angle of the housing unit 500 is formed.

The guide unit 600 may be inserted into the insertion grooves 411 and 421 of the cage unit 400 as described above. In an embodiment, the guide unit 600 is a cylindrical roller, and may be inserted into each of the insertion groove 411 of the first cage 410 and the insertion groove 421 of the second cage 420 and seated in the seating groove 520 of the housing unit 500.

In an embodiment, in a state in which the cage unit 400 is not rotated, the guide unit 600 is inserted into the seating groove 520, and in this state, when the sun gear unit 100 is driven, the guide unit 600 is not rotated while being inserted into the insertion grooves 411 and 421 and the seating groove 520 due to a gap between the seating groove 520 and the guide unit 600. Accordingly, as the ring gear unit 300 is not rotated, the transmission 10 forms a neutral state and generates no power.

In an embodiment, in a state in which the cage unit 400 rotates, the guide unit 600 deviates from the seating groove 520 and is in contact with an inner surface of the housing unit 500. In other words, the guide unit 600 functions as a stopper between the insertion grooves 411 and 421 and the inner surface of the housing unit 500. Accordingly, when the sun gear unit 100 is driven, the ring gear unit 300 rotates, and thus, the transmission 10 may generate power.

The adjustment unit 700 is connected to the cage unit 400 as described above, and may manipulate a rotational state of the cage unit 400. For example, the adjustment unit 700 may include the first adjustment pin 710 and the second adjustment pin 720.

The first adjustment pin 710 may be inserted into the fastening hole 413 of the first cage 410 and may protrude to the outside through the adjustment window 510 of the housing unit 500. Also, the second adjustment pin 720 may be inserted into the fastening hole 423 of the second cage 420 and may protrude to the outside through the adjustment window 510 of the housing unit 500.

In an embodiment, when the transmission 10 is in a neutral state, the adjustment unit 700 may be arranged on a center line CL passing through a center of the adjustment window 510. In this state, when the first adjustment pin 710 or the second adjustment pin 720 rotates toward both ends of the adjustment window 510, the first cage 410 or the second cage 420 corresponding thereto may also rotate in the same direction and by the same amount.

In the drawings, the adjustment unit 700 is shown to be a bolt or bar-shaped member to help in understanding, but the shape of the adjustment unit 700 is not limited thereto. The adjustment unit 700 may be a member capable of rotating the cage unit 400, and may have other general configurations, shapes, or mechanisms for controlling the transmission 10.

The second cover C2 may be arranged on the housing unit 500, and the second carrier 820 may be arranged at the inner side of the second cover C2. As the first carrier 810, the planetary gear unit 200 may be inserted into the second carrier 820. Also, the bearing B may be arranged between the second cover C2 and the second carrier 820.

An output gear 900 may be arranged on the second carrier 820. When the transmission 10 generates power, the second carrier 820 rotates, and thus, the output gear 900 may also rotate.

Hereinafter, an operating state of the transmission 10 according to an embodiment is described in detail with reference to FIGS. 9 to 11.

FIG. 9 shows a case where the transmission 10 according to an embodiment is in a neutral state. The center line CL is an imaginary line passing through the center of the housing unit 500 and the center of the adjustment window 510 in a circumferential direction, and in the neutral state, the adjustment unit 700 is arranged on the center line CL. In other words, in a state in which the first adjustment pin 710 and the second adjustment pin 720 are connected to the first cage 410 and the second cage 420, respectively, the first adjustment pin 710 and the second adjustment pin 720 are not rotated, and thus, the first cage 410 and the second cage 420 are also not rotated.

Accordingly, the guide unit 600 inserted into each of the insertion groove 411 of the first cage 410 and the insertion groove 421 of the second cage 420 is arranged to correspond to the seating groove 520 of the housing unit 500. In this state, when the sun gear unit 100 rotates, the planetary gear unit 200 also rotates, and because guide unit 600 and the seating groove 520 has a gap therebetween, the guide unit 600 is not rotated while being inserted into the seating groove 520, and the ring gear unit 300 is also not rotated.

Therefore, the transmission 10 maintains the neutral state.

FIG. 10 shows a case where the transmission 10 according to an embodiment is in a first stage state. As shown in FIG. 10, when the first adjustment pin 710 of the adjustment unit 700 is rotated by a predetermined angle, θ, in one direction, the first cage 410 is also rotated by the same angle, θ. In this state, the second adjustment pin 720 is arranged on the center line CL. In addition, the guide unit 600 inserted into the insertion groove 411 of the first cage 410 deviates from the seating groove 520 and is in contact with the inner circumferential surface of the housing unit 500. Accordingly, the guide unit 600 functions as a stopper between the first cage 410 and the housing unit 500. In addition, when the sun gear unit 100 rotates in this state, the planetary gear unit 200 also rotates, and the ring gear unit 300, that is, the first ring gear 310 also rotates and generates power.

FIG. 11 shows a case where the transmission 10 according to an embodiment is in a second stage state. As shown in FIG. 11, when the second adjustment pin 720 of the adjustment unit 700 is rotated by a predetermined angle, θ, in one direction, the second cage 420 is also rotated by the same angle, θ. In this state, the second adjustment pin 720 is arranged on the center line CL. In addition, the guide unit 600 inserted into the insertion groove 421 of the second cage 420 deviates from the seating groove 520 and is in contact with the inner circumferential surface of the housing unit 500. Accordingly, the guide unit 600 functions as a stopper between the second cage 420 and the housing unit 500. In addition, when the sun gear unit 100 rotates in this state, the planetary gear unit 200 also rotates, and the ring gear unit 300, that is, the second ring gear 320 also rotates and generates output.

In an embodiment, the adjustment unit 700 may rotate the cage unit 400 in any direction. In other words, FIGS. 9 to 11 illustrate that the first adjustment pin 710 and the second adjustment pin 720 rotate to the right to rotate the cage unit 400, but the disclosure is not limited thereto. For example, even when the adjustment unit 700 rotates to the left to rotate the cage unit 400, the guide unit 600 deviates from the seating groove 520, and thus, the same effect may be obtained.

In other words, the transmission 10 according to an embodiment may simply perform a shift operation by rotating the adjustment unit 700 to one side or the other side (left or right in the drawings), and in particular, may apply a principle of one-way clutch no matter which direction the adjustment unit 700 is rotated.

The transmission 10 according to an embodiment may perform a simple operation with a simple configuration, thereby reducing the size and weight of the transmission 10 and the powertrain device 1 including the same.

The transmission 10 according to an embodiment may be arranged coaxially with a rotation shaft 23 of the power source 20. Also, an output axis of the transmission 10 may be arranged coaxially with the input axis i thereof. Accordingly, the size and weight of the transmission 10 and the powertrain device 1 including the same may be reduced.

The transmission 10 according to an embodiment may perform a shift operation even when the adjustment unit 700 rotates in either left or right direction, thereby minimizing a case where the arrangement, shape, or size of the transmission 10 is limited by other members that may be included in a powertrain mechanism of an electric vehicle. Also, the transmission 10 may be easily linked with other powertrain mechanisms to perform a shift operation.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the drawings, it will be understood by those of ordinary skill in the art that various changes in form and details may be made therein without departing from the spirit and scope of the disclosure as defined by the following claims.

Particular technical content described in the embodiments is illustrative examples of the disclosure and is not intended to limit the scope of the disclosure. In order to concisely and clearly describe the disclosure, descriptions of general techniques and configurations of the related art may be omitted. Furthermore, the connecting lines or connectors shown in the drawings presented are intended to represent exemplary functional relationships and/or physical or logical couplings between the various components. It should be noted that many alternative or additional functional relationships, physical connections or logical connections may be present in a practical device. Moreover, no item or component is essential to the practice of the disclosure unless the component is specifically described as "essential" or "critical."

The use of the terms "a" and "an" and "the" and similar referents described in the detailed description section and the following claims are to be construed to cover both the singular and the plural, unless otherwise indicated. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. The disclosure is not limited to the described order of the steps. The use of any and all examples, or exemplary language (e.g., "such as") provided herein, is intended merely to better illuminate the disclosure and does not pose a limitation on the scope of the disclosure unless otherwise claimed. Also, numerous modifications and adaptations will be readily apparent to those of ordinary skill in the art without departing from the spirit and scope of the disclosure.

DESCRIPTION OF REFERENCE NUMERALS

10: transmission
100: sun gear unit
200: planetary gear unit
300: ring gear unit
400: cage unit
500: housing unit
600: guide unit
700: adjustment unit

What is claimed is:
1. An electric vehicle transmission comprising:
a sun gear unit connected to a transmission motor, a plurality of planetary gear units connected to the sun gear unit, and a ring gear unit connected to the planetary gear units, and
further comprising a cage unit arranged to surround the plurality of planetary gear units at an inner side thereof, a housing unit arranged at an outer side of the cage unit and having a hollow therein, at least one guide unit arranged between the cage unit and the housing unit, and an adjustment unit configured to adjust a position of the cage unit with respect to the housing unit, wherein the adjustment unit is inserted into a fastening hole of the cage unit, protrudes to outside through an adjustment window formed on one side of the housing unit, and is configured to adjust a rotation angle of the cage unit with respect to the housing unit to perform a shift operation.

2. The electric vehicle transmission of claim 1, wherein the cage unit comprises a plurality of insertion grooves apart by a predetermined distance along an outer circumferential surface thereof, the housing unit comprises a plurality of seating grooves corresponding to the insertion grooves, and the at least one guide unit is inserted into the insertion grooves, respectively, and while the cage unit rotates by the adjustment unit, is seated in the seating grooves or deviates therefrom to perform a shift operation.

3. The electric vehicle transmission of claim 2, wherein, when the at least one guide unit is arranged in a center of the adjustment window, the at least one guide unit is seated in the insertion grooves to form a neutral state, and when the at least one guide unit rotates by a predetermined angle or more from the center of the adjustment window to one side or other side thereof, the at least one guide unit deviates from the seating grooves to generate power.

4. The electric vehicle transmission of claim 1, wherein the cage unit comprises a first cage and a second cage, arranged in an axial direction, the ring gear unit comprises a first ring gear and a second ring gear, arranged at inner sides of the first cage and the second cage, respectively, the planetary gear units comprise a planetary gear shaft, a plurality of first planetary gears arranged on one side of the planetary gear shaft and connected to the sun gear unit and the first ring gear, and a second planetary gear arranged on the other side of the planetary gear shaft and connected to the second ring gear, the at least one guide unit comprises a first guide pin connected to the first cage and a second guide pin connected to the second cage, and a neutral state and first-stage and second-stage gear shift operations are performed according to rotation angles of the first guide pin and the second guide pin.

5. The electric vehicle transmission of claim 4, wherein, when the first guide pin and the second guide pin are arranged in a center of the adjustment window in a circumferential direction, the neutral state is formed, when the first guide pin rotates by a predetermined angle or more from the center of the adjustment window to one side or the other side thereof and the second guide pin is arranged in the center of the adjustment window, a first-stage gear shift state is formed, and when the second guide pin rotates by a predetermined angle or more from the center of the adjustment window to one side or the other side thereof and the first guide pin is arranged in the center of the adjustment window, a second-stage gear shift state is formed.

* * * * *